United States Patent
Tanaka

Patent Number: 5,533,010
Date of Patent: Jul. 2, 1996

[54] CHANNEL SWITCHING CONTROL METHOD AND A CORDLESS TELEPHONE SYSTEM USING THE SAME

[75] Inventor: Kiyoshi Tanaka, Chiba, Japan

[73] Assignee: Uniden Corporation, Ichikawa, Japan

[21] Appl. No.: 305,926

[22] Filed: Sep. 19, 1994

[30] Foreign Application Priority Data

Dec. 14, 1993 [JP] Japan ..................... 5-342606

[51] Int. Cl.⁶ ............................. H04B 1/69; H04B 7/216; H04M 11/00
[52] U.S. Cl. ................................ 370/18; 375/208; 379/61
[58] Field of Search ................................ 370/18, 24, 29, 370/95.1, 95.3, 100.1, 105.1; 375/200, 205, 206, 208, 209, 210; 379/58, 61, 62, 63; 455/34.1, 34.2, 38.1, 49.1, 50.1, 53.1, 54.1, 63, 67.1, 67.3, 68, 69, 70

[56] References Cited

U.S. PATENT DOCUMENTS

| | | | |
|---|---|---|---|
| 4,783,844 | 11/1988 | Higashiyama et al. | 455/34.2 |
| 4,984,247 | 1/1991 | Kaufmann et al. | 375/200 |
| 5,109,390 | 4/1992 | Gilhousen et al. | 375/205 |
| 5,164,958 | 11/1992 | Omura | 375/206 |
| 5,235,615 | 8/1993 | Omura | 375/205 |
| 5,375,140 | 12/1994 | Bustamante et al. | 375/205 |
| 5,434,905 | 7/1995 | Maeda et al. | 379/61 |

*Primary Examiner*—Alpus H. Hsu
*Attorney, Agent, or Firm*—Lowe, Price, LeBlanc & Becker

[57] ABSTRACT

A cordless telephone system including a master phone connected to a telephone line and a slave phone executing communication via one of a plurality of radio channels switchable to said master phone, the master phone and slave phone each having a correlation detector for detecting a correlation value between a received signal and a reference spreading code series, a comparator for comparing the correlation valued detected by the comparator to a prespecified reference correlation value, and a control circuit continuing communication by switching a radio channel when it is determined that the correlation value is lower than the prespecified reference value.

22 Claims, 12 Drawing Sheets

F I G. 6
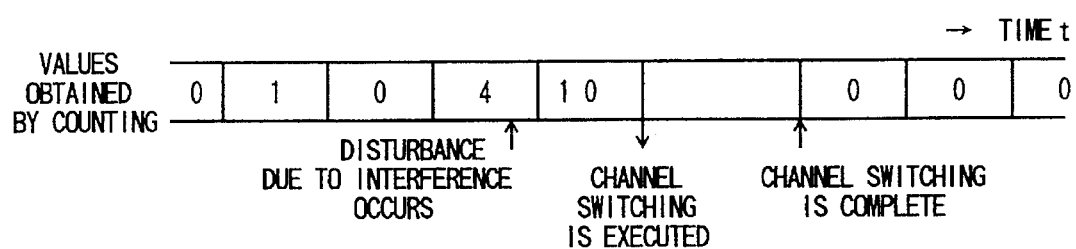

CHANNEL SWITCHING CONTROL METHOD AND A CORDLESS TELEPHONE SYSTEM USING THE SAME

FIELD OF THE INVENTION

The present invention relates to a cordless telephone system comprising a master phone connected to a public telephone line and a slave phone executing communications via one of a plurality of radio channels each switchable to said master phone by means of a spread spectrum system, and especially to a method of switching a channel for communications to be continued therethrough by detecting a correlation value between a received signal and a reference spreading code series to switch a radio channel and a cordless telephone system using the same.

BACKGROUND OF THE INVENTION

As a method of switching a channel in the conventional type of cordless telephone system, there have been put into practical use a method in which a signal vs noise ratio during communications is detected and channel switching is executed depending on a time ratio lower than a specified threshold value, and a method in which a received signal input (level) is detected and channel switching is similarly executed depending on a time ratio lower than a specified value, and furthermore there has been proposed a method in which channel switching is executed during call depending both a relation between a signal vs noise ratio and a specified threshold value and a relation between a received signal level and a specified threshold value in mobile radio communication. In addition, also a method has been proposed in which a ratio of communication level vs an interference wave level in a calling channel which is a channel in service is measured and a channel is switched when the measured value is not more than a specified value.

Also in U.S. Pat. No. 4,783,844 is disclosed a system in which a specific ID code assigned to each device is used for communication and channel switching is executed according to whether the ID code has correctly been received or not. Namely in this system, when the ID code is not received correctly, the channel in service is switched depending on the detection signal.

In a mobile radio communication system such as a cordless telephone system, however, detection of disturbance by an interference wave is very difficult, and also in the systems as described above, if strong interference occurs, transaction of control data required for an operation to switch a channel becomes impossible, which in turn makes it difficult to continue communication.

In the channel switching method disclosed in U.S. Pat. No. 4,783,844 described above, it is necessary to set up a special ID code for only switching a channel, and also it is necessary to always receive or send the ID code together with an voice signal. As a result, it is necessary to accurately separate an voice signal using a relatively high frequency from a data signal using a relatively low frequency, and excessive work load is disadvantageously loaded to a modulating section executing the separating operation above or a demodulating section.

SUMMARY OF THE INVENTION

It is an object of the present invention to make it possible to accurately execute channel switching without using any specific ID code as well as to continue communication without causing any trouble during call, even if strong interference occurs.

In a channel switching control method according to the present invention, a correlation value between a received signal and a reference spreading code series is detected, the detected correlation value is compared to a prespecified reference value, and a radio channel is switched according to a result of the comparison.

In a channel switching control method according to the present invention, a correlation value between a received signal and a reference spreading code series is detected, and channel switching is controlled according to a combination of the detected correlation value with at least one of the detected interference wave level, a received signal level, and a signal vs noise ratio.

In a cordless telephone system according the present invention, a correlation value between a received signal and a reference spreading code series is detected between the master phone and the slave phone, and when it is determined from the result of the comparison that the correlation value is lower than the reference value, a radio channel is switched to continue communication.

In a cordless telephone system according to the present invention, a correlation value between a received signal and a reference spreading code series is detected between a master phone and a slave phone, a signal level of the received signal is detected, and detected correlation value is compared to a prespecified reference value, and a radio channel is switched according to a result of the comparison as well as to the detected signal level to continue communication.

In a cordless telephone system according to the present invention, a correlation value between a received signal and a reference spreading code series is detected between a master phone and a slave phone, a level of an interference wave is detected, the detected correlation value is compared to a prespecified reference value, and a radio channel is switched according to a result of the comparison as well as the detected level of the interference wave to continue communication.

In a cordless telephone system according to the present invention, a correlation value between a received signal and a reference spreading code series is detected between a master phone and a slave phone, a signal vs noise ratio is detected, the detected correlation value is compared to a prespecified reference value, and a radio channel is switched according to a result of the comparison as well as to the detected signal vs noise ratio to continue communication.

In a cordless telephone system according to the present invention, a correlation value between a received signal and a reference spreading code series is detected between a master phone and a slave phone, a signal level of the received signal is detected, a level of an interference wave is detected, a signal vs noise ratio is detected, the detected correlation value is compared to a prespecified reference value, and a radio channel is switched according to a combination of the result of the comparison with at least one of the detected interference wave level, detected received signal level, and detected signal vs noise ratio to continue communication.

In a cordless telephone system according to the present invention, a correlation value between a received signal and a reference spreading code series is detected, the detected correlation value is compared to a prespecified reference value, output of said result of comparison is sampled at a constant time interval, a sample value during a cycle which is an integral number times of the interval for sampling is counted, and a radio channel is switched, when the count value goes down below a certain value, to continue communication.

In a cordless telephone system according to the present invention, a master phone and a slave phone executes communication by means of time division, and when it is determined that synchronism of a burst frame can not be maintained for a certain period of time, a radio channel is switched to continue communication.

In a cordless telephone system according to the present invention, when a radio channel is switched, either a master phone or a slave phone receives a call switching one of radio channels, either one which received the call sends a burst signal for synchronism making use of a channel not being used of the plurality of channels thereof, and the other one not receiving the call receives the bust signal switching a plurality of radio channels thereof, and restarts communication through a channel in which the burst signal was detected.

Other objects and features of this invention will become understood from the following description with reference to the accompanying drawings.

BRIEF DESCRIPTION OF THE DRAWINGS

FIG. 6 is a timing chart illustrating a case where channel switching is executed according to a value obtained by counting output of the comparison shown in FIG. 5 as a numerical value;

DESCRIPTION OF THE PREFERRED EMBODIMENTS

Description is made hereinafter for a channel switching control method according to the present invention and embodiments of a cordless telephone system using the same.

Figure 1:
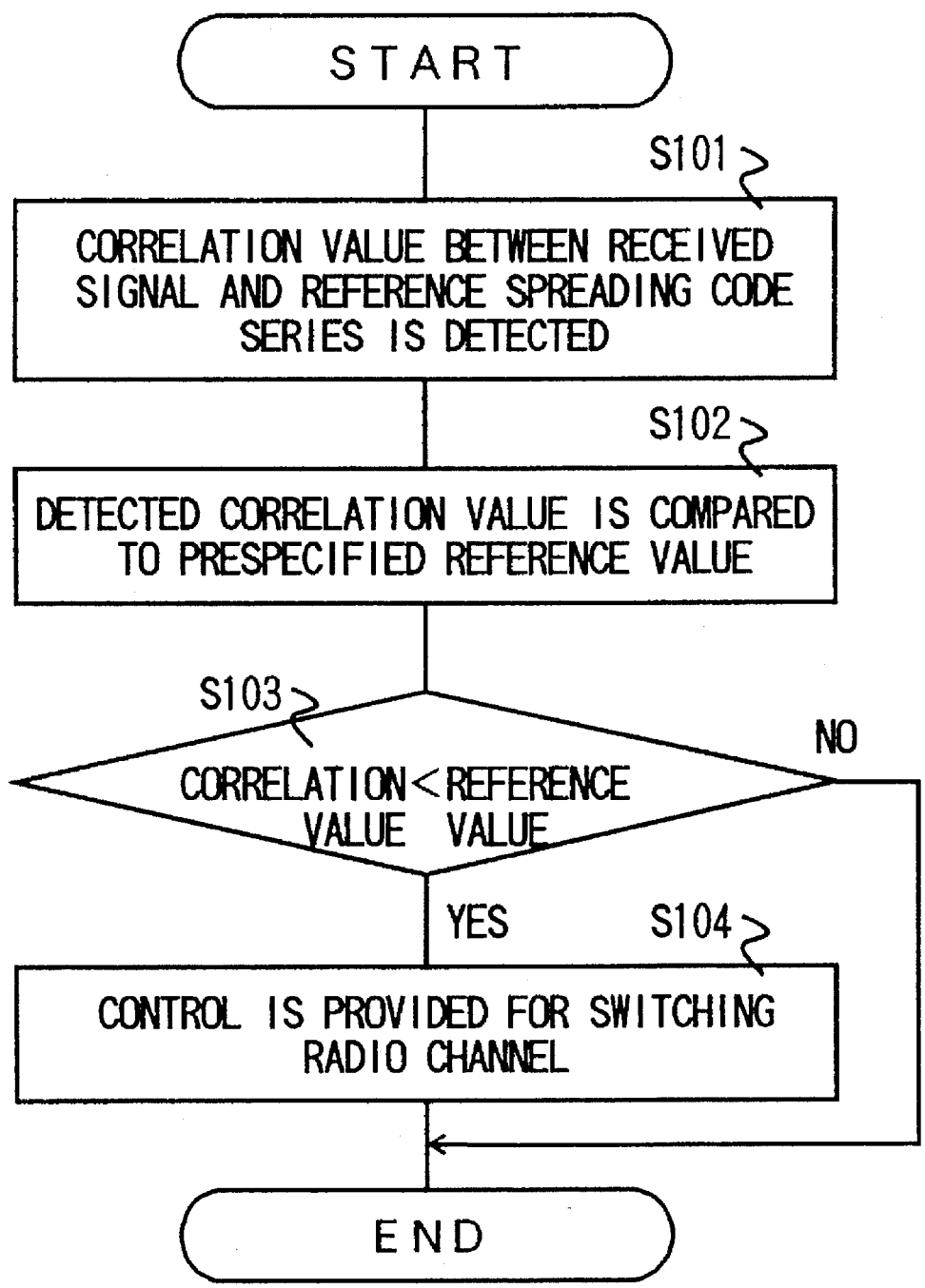
FIG. 1 is a flow chart illustrating basic operations in a channel switching control method according to the present invention.

FIG. 1 is a flow chart illustrating control operations in the channel switching control method, and at first between a master phone connected to a telephone line and a slave phone executing communication via one of a plurality of radio channels each switchable to said master phone by means of the spread spectrum system, a correlation value between a received signal and a reference spreading code series is detected (S101), the detected correlation value is compared to a prespecified reference value (S102), determination as to whether the correlation value is lower than the reference value or not is made depending on a result of the comparison above (S103), and control is provided for switching a radio channel when it is determined that the correlation value is lower than the reference value (S104).

Herein, the spread spectrum system described above is a system in which a communication system excellent in terms of anti jamming characteristics and security of signals is realized by executing secondary modulation, when transferring a data signal, with a spreading code series to convert the signal to one having a wider band width than the original band width (spectrum width) specific to the signal for transmission.

In addition to the above embodiment in which a correlation value between a received signal and a reference spreading code series is detected and a radio channel is switched by using the detected correlation value, the communication system may be built as a system in which a level of an interference wave, a level of a received signal, or a signal vs noise ratio is detected like in the prior art, and a radio channel is switched according to a combination of the detected correlation value with at least one of the detected interference wave level, detected received signal level, and detected signal vs noise level.

Figure 2:
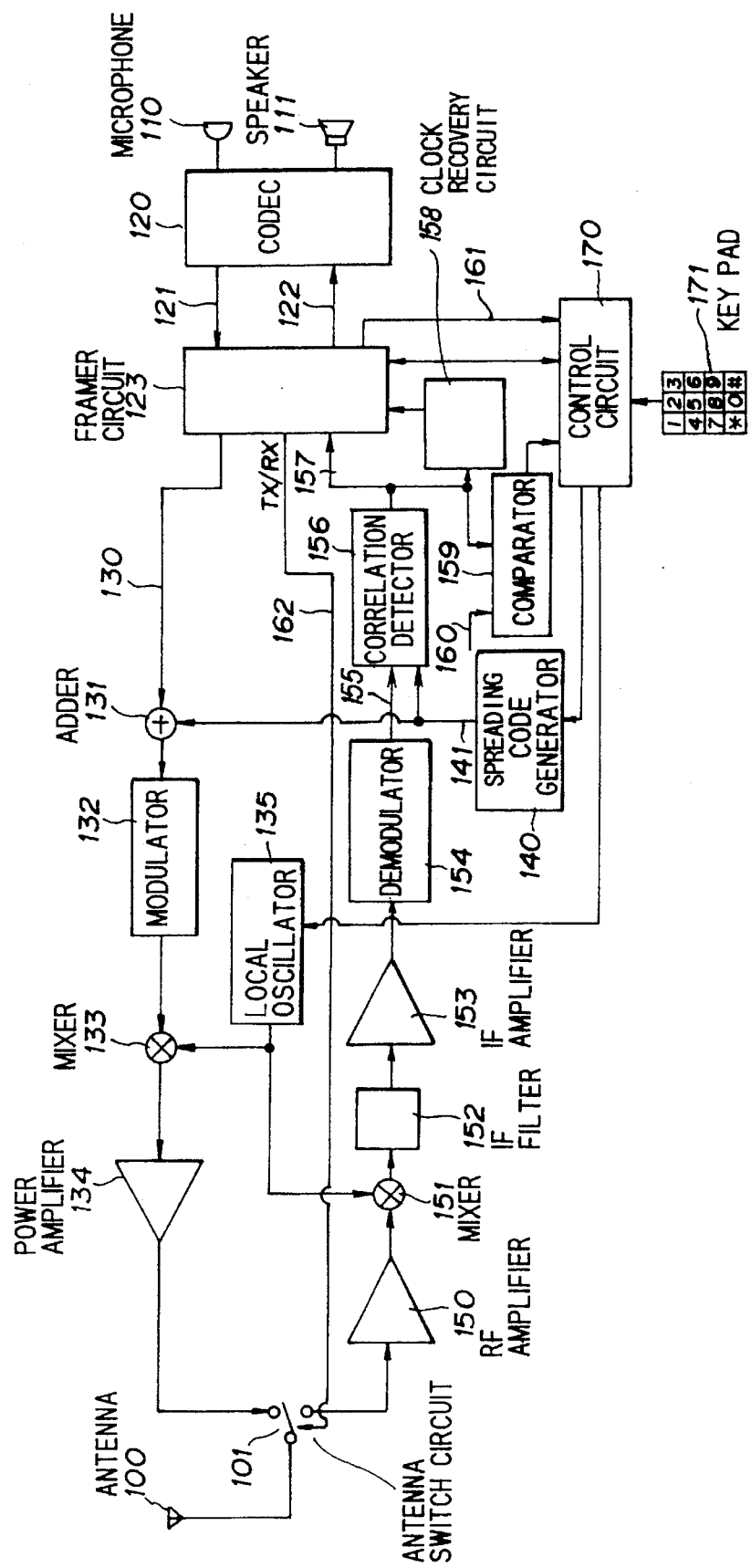
FIG. 2 is a block diagram illustrating configuration of a slave phone in a cordless telephone system according to the present invention.

Next description is made for an embodiment of a cordless telephone system using the channel switching control method according to the above embodiment with reference to the related drawings. FIG. 2 is a block diagram illustrating configuration of a slave phone in a cordless telephone system according to the present invention, and in this figure, designated at the reference numeral 100 is an antenna used for sending or receiving a signal, at 101 an antenna switch circuit for switching a signal flow, at 110 a microphone used for inputting voice, at 111 a speaker which outputs voice, at 120 a CODEC which converts an analog (digital) voice signal to a digital (analog) voice signal, at 121 a digital voice signal converted by the CODEC 120, and at 122 a digital voice signal inputted into the CODEC 120.

Also designated at the reference numeral 123 is a framer circuit into which the digital voice signal 121 is inputted and which converts the signal to a time division multiplexed burst-like base band data, at 130 base band data converted in the framer circuit 123, at 131 an adder for computing an exclusive OR of the base band data 130 and a spreading code series (described later), at 132 a modulator for modulating output of the exclusive logical sum from the adder 131, at 133 a mixer circuit which multiplies the modulated output from the modulator 132 by an output from a local oscillator (described later) and converts the product to an RF signal, at 134 a power amplifier which subjects the RF signal outputted from the mixer circuit 133 to power amplification, and at 135 a local oscillator for outputting a signal to the mixer circuit above or other components.

Also designated at the reference numeral 140 is a spreading code generator which generates spreading code under control by a control circuit (described later), at 141 a spreading code series generated by the spreading code generator 140, at 150 an RF amplifier which amplifies a signal inputted via the antenna 100 and the antenna switch circuit 101, at 151 a mixer circuit which multiplies an output from the RF amplifier by an output from the local oscillator 135, at 152 an IF filter which converts an output from the mixer circuit 151 to an IF frequency, at 153 an IF amplifier which amplifies an output from the IF filter 152, at 154 a demodulator which demodulates an output from the IF amplifier 153, at 155 a demodulated output from the demodulator 154, at 156 a correlation detector which computes a correlation value between the demodulated output 155 and the spreading code series corresponding to the transmission side and converts the output to a base band signal, at 157 a base band signal outputted from the correlation detector 156, at 158 a clock recovery circuit into which a portion of the base band signal 157 is inputted and which supplies timing data to the framer circuit 123 by recovering the clock timing, and at 159 a comparator into which a portion of the base band signal is inputted and which compares the portion of base band signal to a certain reference correlation value.

Furthermore designated at the reference numeral 160 is a certain reference correlation value to be inputted into the comparator, at 161 a data signal concerning a synchronism status outputted from the framer circuit 123, at 162 a sending/receiving switching data signal outputted from the framer 123, at 170 a control circuit controlling the entire system, and at 171 a dial key pad which input an operation signal to the control circuit 170, such as a CORDLESS TELEPHONE MODEL: EXP9100 and its Service Information Manual, made by Uniden Corporation and Sold by Uniden America Corporation.

Next description is made for operations. The voice signal inputted from the microphone 110 is converted by the CODEC 120 to a digital voice signal, which is then converted by the framer circuit 123 to time division multiplied burst-like base band data 130. Then the exclusive logical sum 131 between the burst-like base band data 130 and the spreading code series 141 from the spreading code generator 140 is computed, and the exclusive logical sum is converted to spreading code and modulated by the modulator 132. It should be noted that the code generated by the spreading code generator 140 is set by the control circuit 170.

An output from the modulator 132 is inputted into the mixer circuit 133, multiplied by an output from the local oscillator 135 to be converted to an RF signal, and is sent to via the antenna switch circuit 101, which is switched according to a sending/receiving switch data signal 162 outputted from the framer circuit 123 from the antenna 100.

In the receiving side, a signal from the antenna 100 is amplified via the antenna switch circuit 101 by the RF amplifier 150, multiplied by an output in the local oscillator 135 and in the mixer circuit 151, and is converted via the IF filter 152 to an IF frequency. Then the signal is amplified by the IF amplifier 153 and demodulated by the demodulator 154. Then a correlation value between the demodulated output 155 and the same spreading code series as that in the sending side is computed by the correlation detector 156, and the correlation value is converted to the base band signal 157.

A portion of the base band signal 157 is inputted into the clock recovery circuit 158, which recovers a clock and supplies timing data to the framer circuit 123. Also the base band signal 157 is inputted into the framer circuit 123 and sampled according to a recovered clock therein, and the voice data 122 is taken out from the time division multiplexed data and inputted into the CODEC 120.

The CODEC 120 converts the voice data 122 to an analog voice signal, and drives the speaker 111 to output a receiver sound. On the other hand, the base band signal 157 is inputted to the comparator 159, compared to the certain reference correlation value 160, and a result of the comparison is outputted to the control circuit 170. The control circuit 170 provides controls over operations of the telephone system as a cordless telephone system according to data inputted from the dial key pad 171 and executes such operations as setting for operations of the framer circuit 123 or control data transaction. Furthermore the control circuit 170 monitors data 161 concerning synchronism status outputted from the framer circuit 123.

Figure 3:
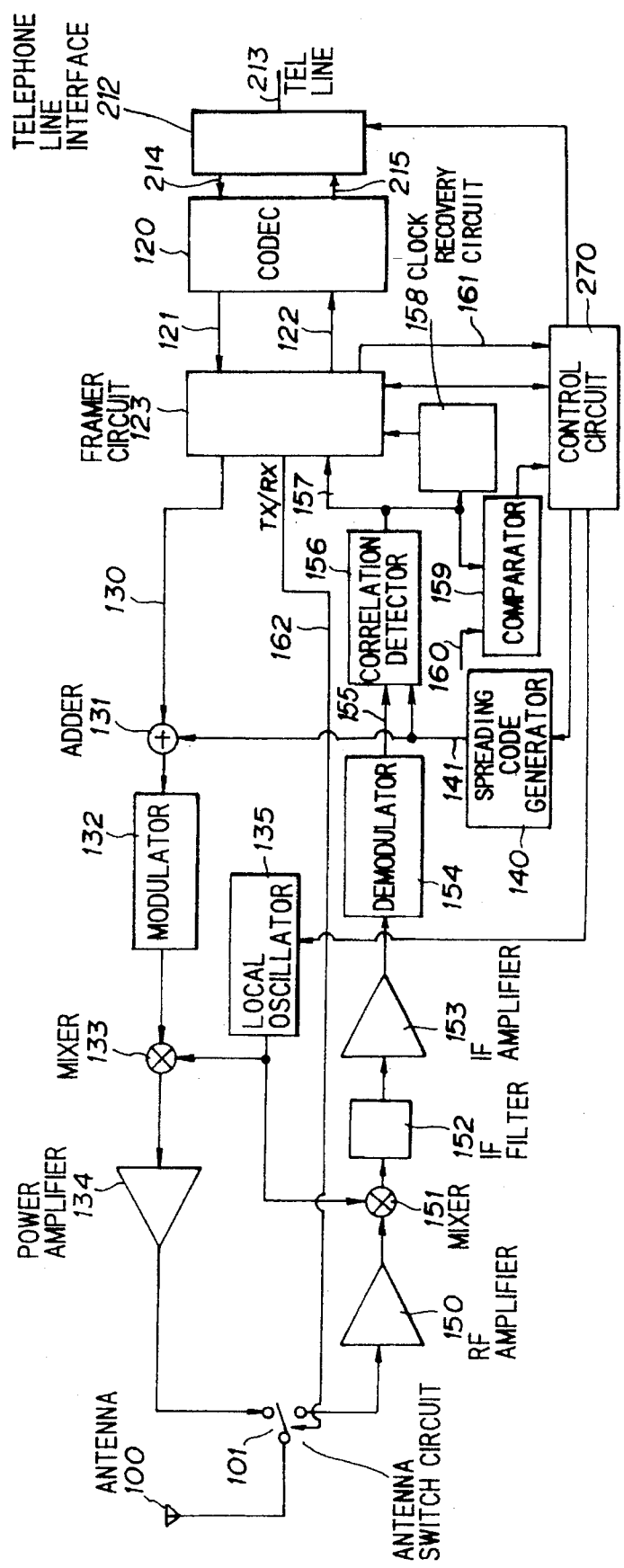
FIG. 3 is a block diagram illustrating configuration of a master phone in the cordless telephone system according to the present invention.

FIG. 3 is a block diagram illustrating configuration of a master machine, and in this block diagram the same reference numeral is given to the same component in the slave phone shown in FIG. 2, so that description thereof is omitted herein and description is made for only portions different from those in the slave phone. In this figure, designated at the reference numeral 212 is a telephone line interface circuit connecting a slave phone to the telephone line, at 213 a telephone line, at 214 a sender sound, at 215 a receiver sound and at 270 a control circuit controlling each component in the master phone.

Next description is made for operations. A signal from a telephone line 213 is divided to a sender sound 214 and a receiver sound 215 by the telephone interface circuit 212, while the control circuit 270 controls the telephone interface circuit 212 to execute signal control between the telephone line 213 and the master phone.

Figure 4:
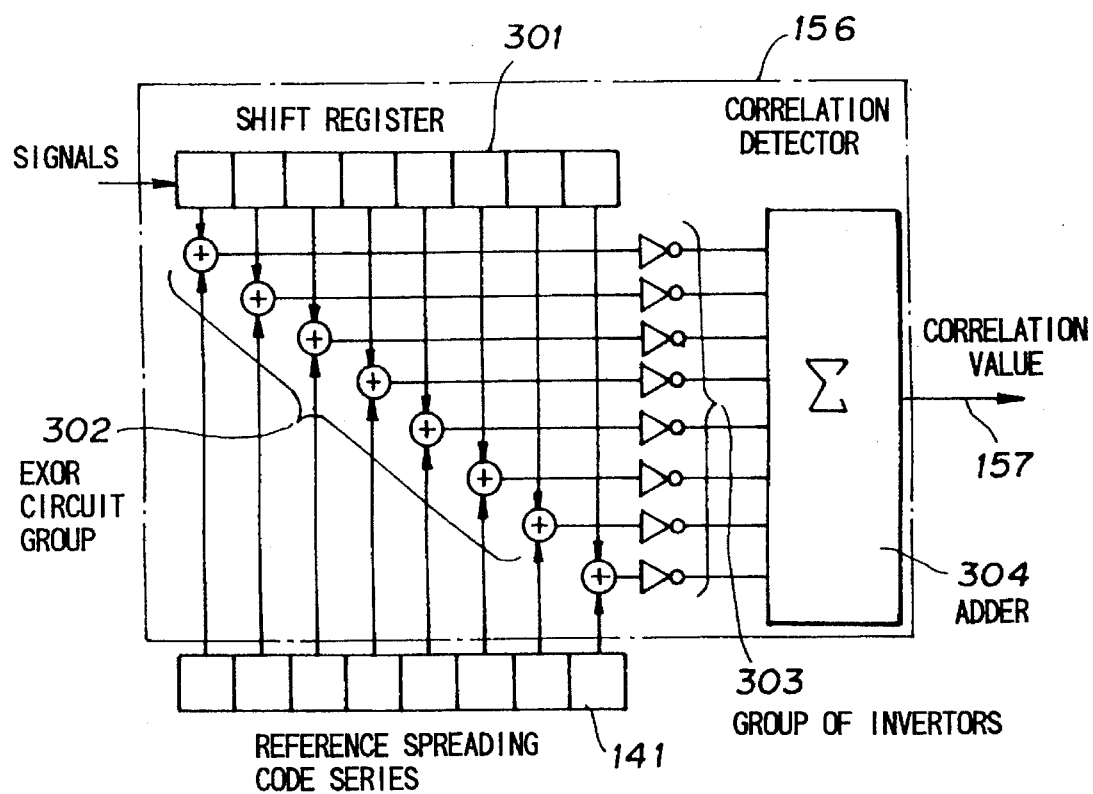
FIG. 4 is an explanatory view for illustrating configuration of a correlation detector shown in FIG. 2 and FIG. 3.

FIG. 4 is an explanatory view for illustrating configuration of the correlation detector 156 shown in FIG. 2 and FIG. 3, and the correlation detector 156 comprises a shift register 301 into which input signals are inputted and which shifts the input signals to a plurality of arrays, a group of EXOR circuits 302 each computing an exclusive logical sum between a signal from the sift register and the reference spreading code series 141, a group of invertors 303 each executing sign reversal of an output from the EXOR circuit group 302, and an adder 304 which computes a sum of outputs from the invertor group 304.

Then description is made for operations. An input signal is inputted into the shift register 301, and an output from each stage of the shift register 301 is processed by the EXOR circuit group 302 to obtain an exclusive logical sum thereof with a reference spreading code series, which is subjected to sign reversal by the invertor group 303. Then the sum is computed by the adder 304, the correlation value is obtained, and the correlation value is outputted as the base band signal 157.

Figure 5:
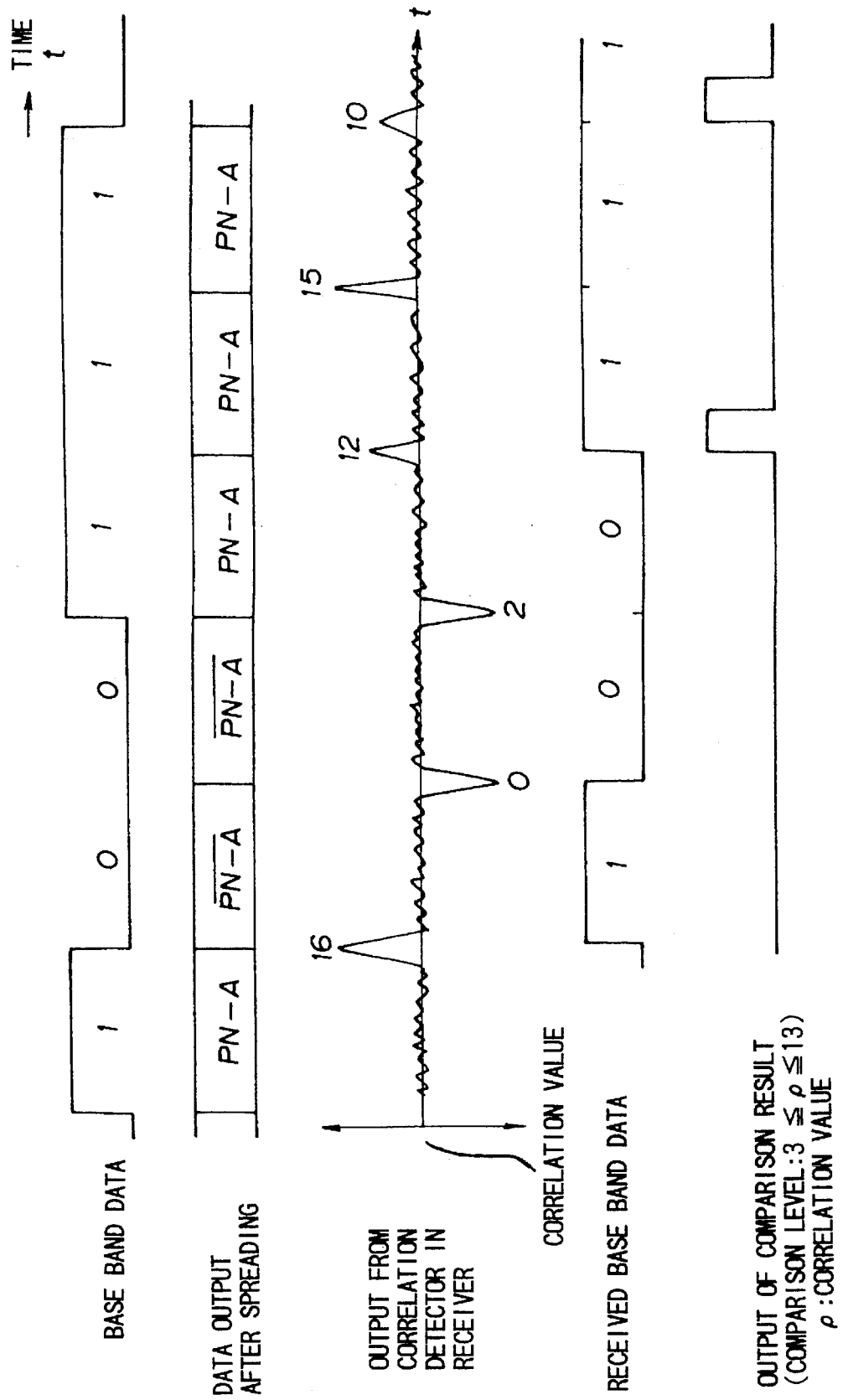
FIG. 5 is a timing chart illustrating an operation for detecting a correlation value.

FIG. 5 is a timing chart illustrating operation for detecting correlation, and description is made for the operation with reference to base band data output, data output after spreading, an output from a correlation detector in a receiver, received base band data output and an output of comparison result. In this figure, when the base band data output is "1", the data output from spreading is a 16-bit length spreading code series PN-A, and on the contrary when the base band data output is "0", the data output from spreading is PN-A with the sign reversed.

Furthermore if a correlation value, an output from the correlation detector 156 in a receiver (a slave phone), is larger than 8 (for instance, 16, 12, 15, 10), and on the contrary if the correlation value is smaller than 8 (for instance, 0, 2), the received base band data is "1". Namely this received base band data is data sampled according to a recovering clock, and if an actual correlation value has degraded from the reference correlation value, in other words, assuming that the comparison level is ($3 \leq$ correlation value $\rho \leq 13$), if the correlation value, an output from the correlation detector in the receiver, is, for instance, 12 or 10, output is "1".

FIG. 6 is a timing chart illustrating a case where a counter (not shown) is provided and channel switching is executed according to values obtained by counting the comparative output shown in FIG. 5 as numerical values at a constant time interval with the counter. If channel switching is executed when the count is 5 or more, at first disturbance due to interference occurs, and the counter shows a count of "4", but if the counter is reset to continue counting and channel switching is executed when the counter shows a count of "10", then channel switching is complete, and then countering is executed at a constant time interval.

Figure 7:
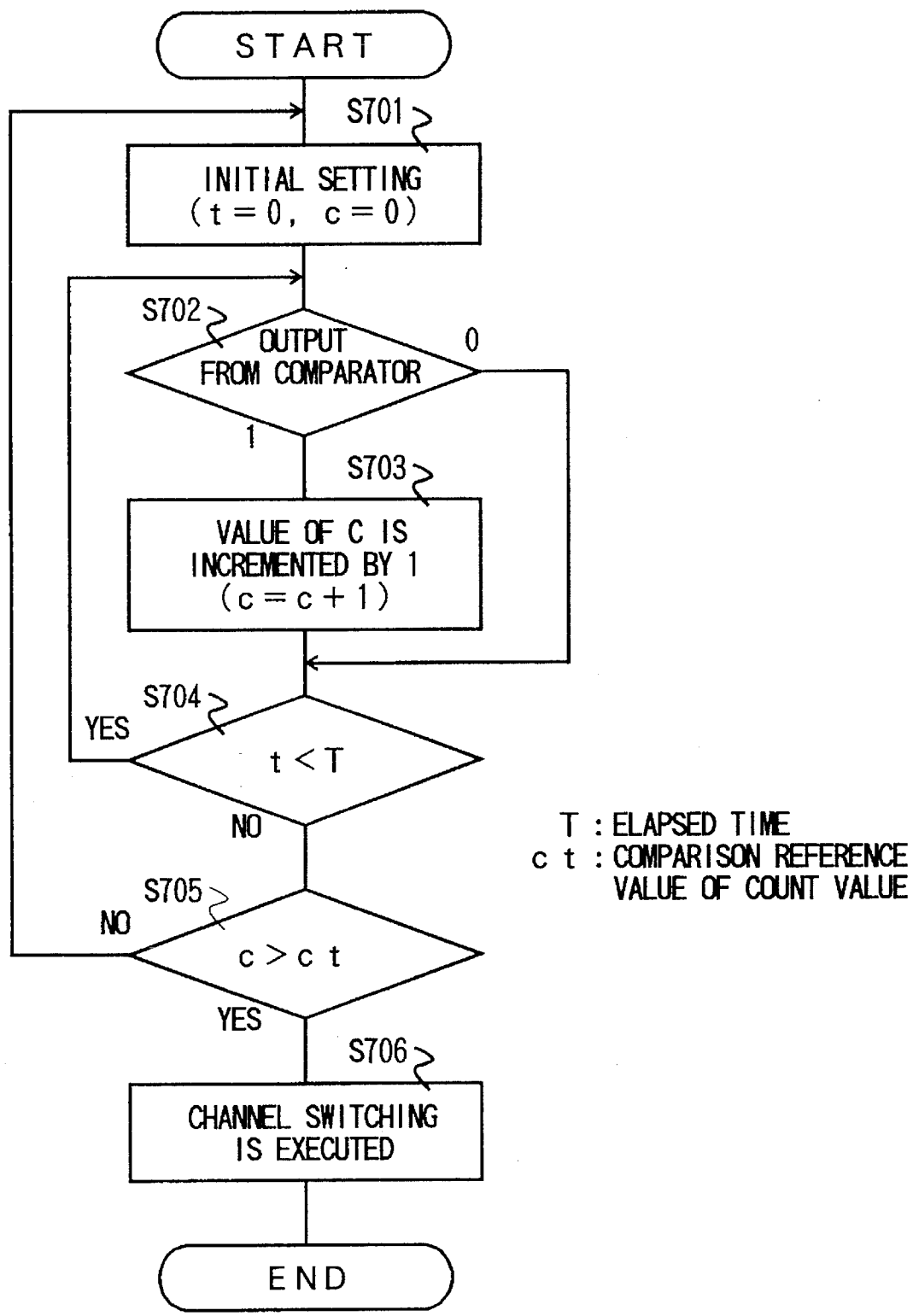
FIG. 7 is a flow chart illustrating operations required prior to a channel switching operation.

FIG. 7 is a flow chart illustrating operations required to be executed prior to channel switching operation, and at first initial setting (t =0, and c=0) is executed (S701). Herein t indicates a time lapse measured by a timer, while c indicates a count provided by the counter. Then determination as to whether an output from the comparator 159 is "0" or "1" is executed(S702), and if it is determined that the output is "1", a value of c is incremented by "1" (c=c+1) (S703). Then the elapsed time t is compared to an observation time T, and whether the elapsed time t is shorter than the observation time T (t<T) or not is determined (S704).

In this step, if it is determined that the elapsed time t is shorter than the observation time T, control returns to the above step S702, and on the contrary if the elapsed time t is not shorter than the observation time T, the count c is compared to a comparison reference value ct for the count, and whether the count c is larger than the comparison reference value ct for the count c (c>ct) or not is determined (S705). As a result, if it is determined that the count c is not larger than the comparison reference value ct for the count, control returns to the above step S701, and on the contrary if it is determined that the count c is larger than the comparison reference value ct for the count, channel switching is executed (S706).

Figure 8A:
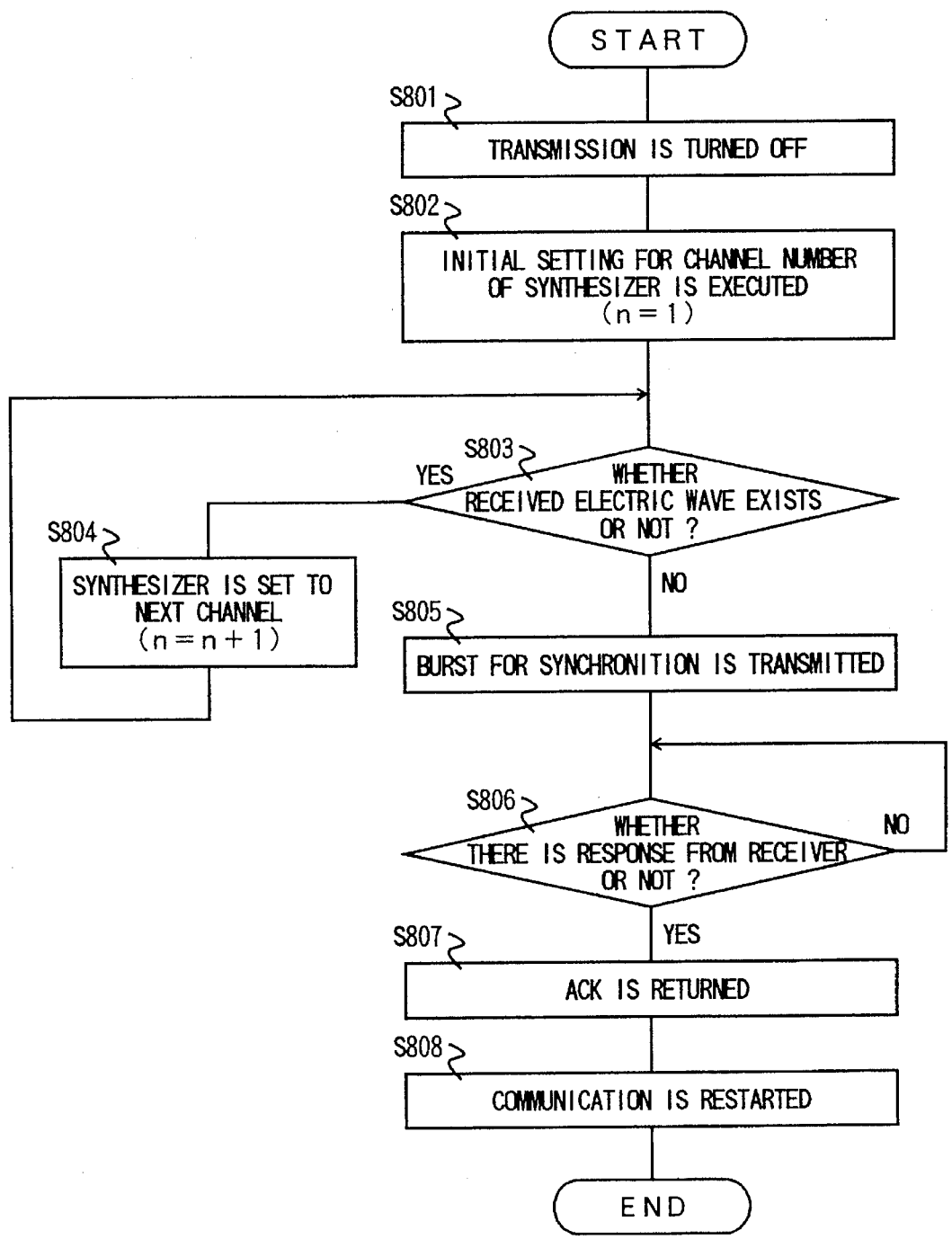
FIG. 8A is a flow chart illustrating a master side and a channel switching operation therein.
Figure 8B:
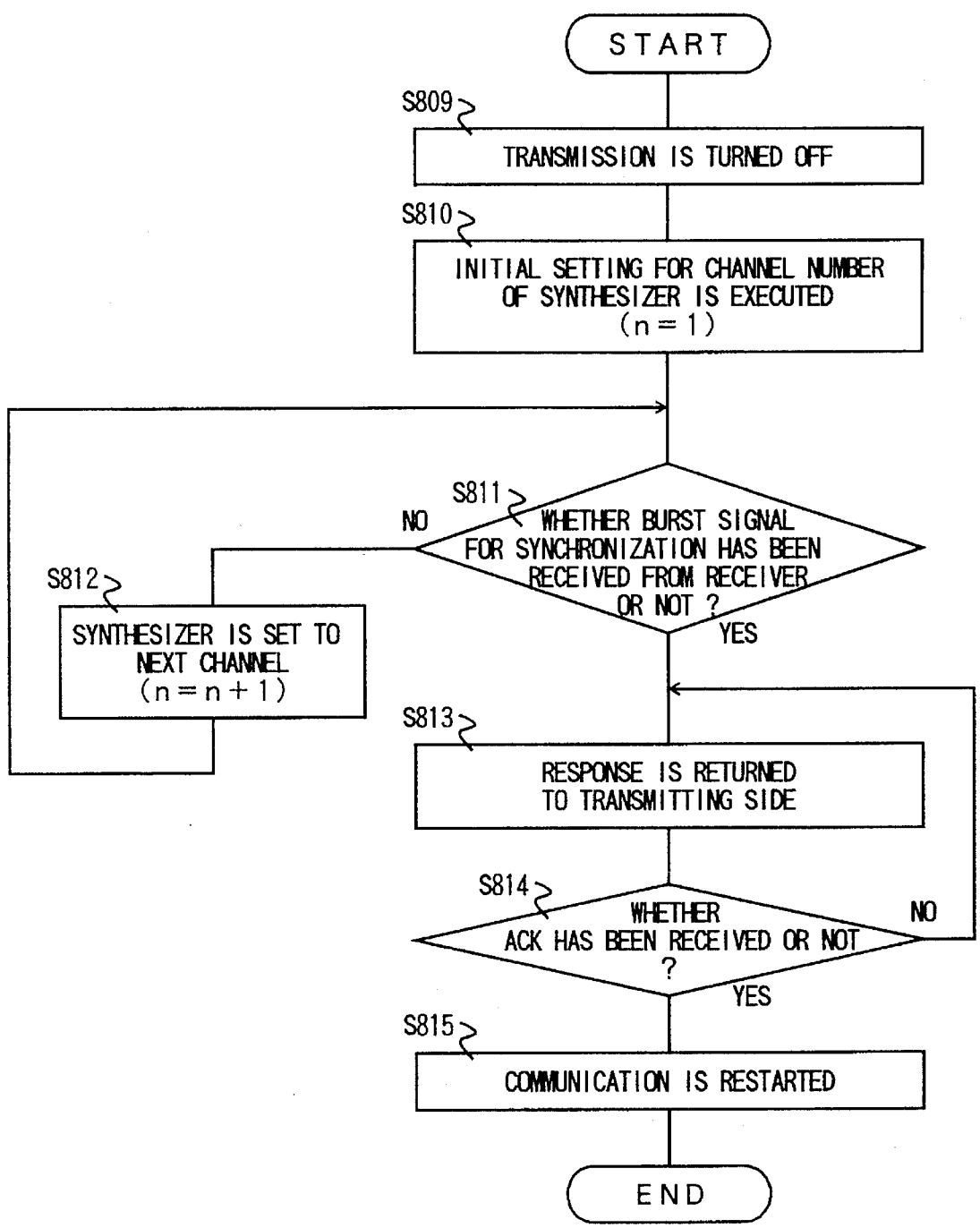
FIG. 8B is a flow chart illustrating a slave side and a channel switching operation therein.

FIG. 8 is a flow chart illustrating operations for channel switching corresponding to the master side (FIG. 8A) and to the slave side (FIG. 8B) respectively. At first, transmission is turned OFF in the master side (S801), and initial setting for a channel No. of a synthesizer is executed (n=1) (S802). Then it is determined whether a received electric wave exists or not (S803), and if it is determined that there exists a received electric wave, the synthesizer is set to the next channel (n=n+1) (S804), and determination in the above step S803 is repeated. On the contrary, if it is determined that there exists no received electric wave, burst for synchronition is transmitted (S805), and determination as to whether there is a response from a receiver or not is executed (S806). If it is determined that there is no response, the determination in this step S806 is repeated until it is determined that there is a response. On the contrary, if it is determined that there is a response from a receiver, ACK is returned (S807), and communication is restarted (S808).

Also in the slave side, transmission is turned OFF in response to an operation in the master side (S809), and initial setting for a channel No. of a synthesizer is executed (n=1) (S810). Then determination as to whether a burst signal for synchronization has been received from a receiver or not is executed (S811), and if it is determined that a burst signal for synchronization has not been received, the synthesizer is set to the next channel number (n=n+1) (S812), and determination in the above step S811 is repeated. On the contrary, if it is determined that a burst signal for synchronization has been received, a response is returned to the transmitting side (S813). Then, determination as to whether ACK has been received or not is executed (S814), and if it is determined that ACK has not been received, control returns to the above step S813, and on the contrary if it is determined that ACK has been received, communication is restarted (S815).

Figure 9:
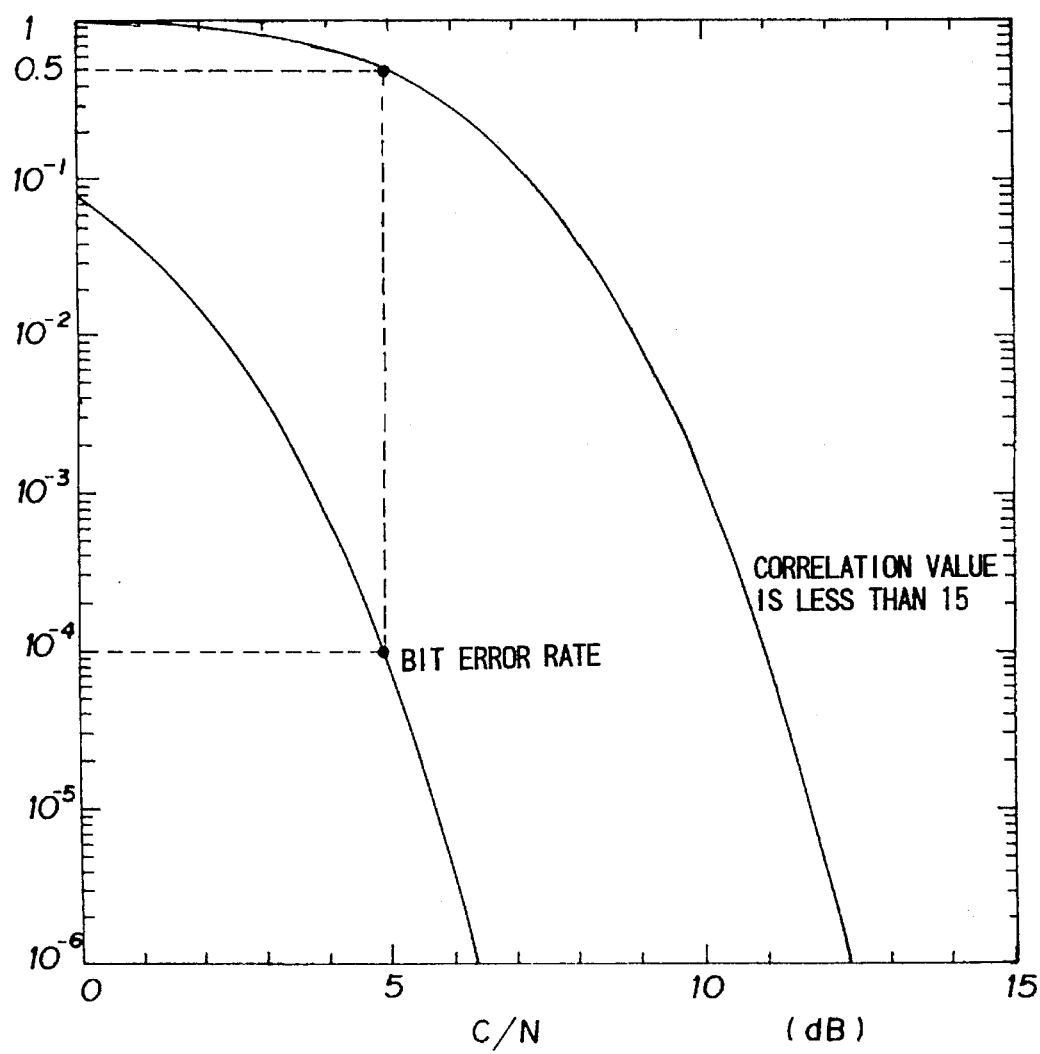
FIG. 9 is a graph showing a bit error ratio characteristics and a probability that the correlation value is lower than 15 when a signal is transferred with 16-bit spreading code.

Next description is made for an optimal value of a threshold value for correlation with a reference to a case where there is not fading for an optimal value of the threshold value for correlation. FIG. 9 shows a probability that a bit error ratio characteristics and the correlation value when transferred in the form of 16-bit spreading code are less than "15". For instance, in order to execute detection of degradation using the bit error rate of $10^{-4}$ as a criteria at which sensing degradation of voice quality is started, it is required to monitor the correlation value for a certain period of time to detect a time point when the ratio of correlation value less than "15" exceeds 50%. Actually as fading occurs, the monitoring time should be adequately long so that the spreading, when averaged, will be as small as possible. Assuming that a man moves at a speed of 5 Km/h and the frequency is 900 MHz, the fading frequency is approx. 4 Hz. Namely, by monitoring for several seconds, also spreading due to fluctuation of fading will become smaller.

The embodiment above is characterized in that the master phone as well as the slave phone detects a correlation value between a received signal and a reference spreading code series, the detected correlation value is compared to a prespecified reference value, and a radio channel is switched according to a result of comparison, but also by detecting, in addition to a correlation value, such factors as a signal level of a received signal, a level of an interference wave, or a signal vs noise ration and combining at least one of the detected values with the correlation valued described above, it is possible to more accurately switch a radio channel, thus a cordless telephone system making it possible to continue communication without any trouble being obtained.

As criteria for determination based on a combination of the above factors. The following combinations are used:

(1) The correlation value is not more than the reference value, and at the same time a level of the received signal is not less than the reference value;

(2) The correlation value is not more than the reference value, and at the same time a level of the interference wave is not less than the reference value; and (3) The correlation value is not more than the reference value, and at the same time the signal vs noise ratio is not more than the reference value (the noise level is not less than the reference value).

Figure 10:
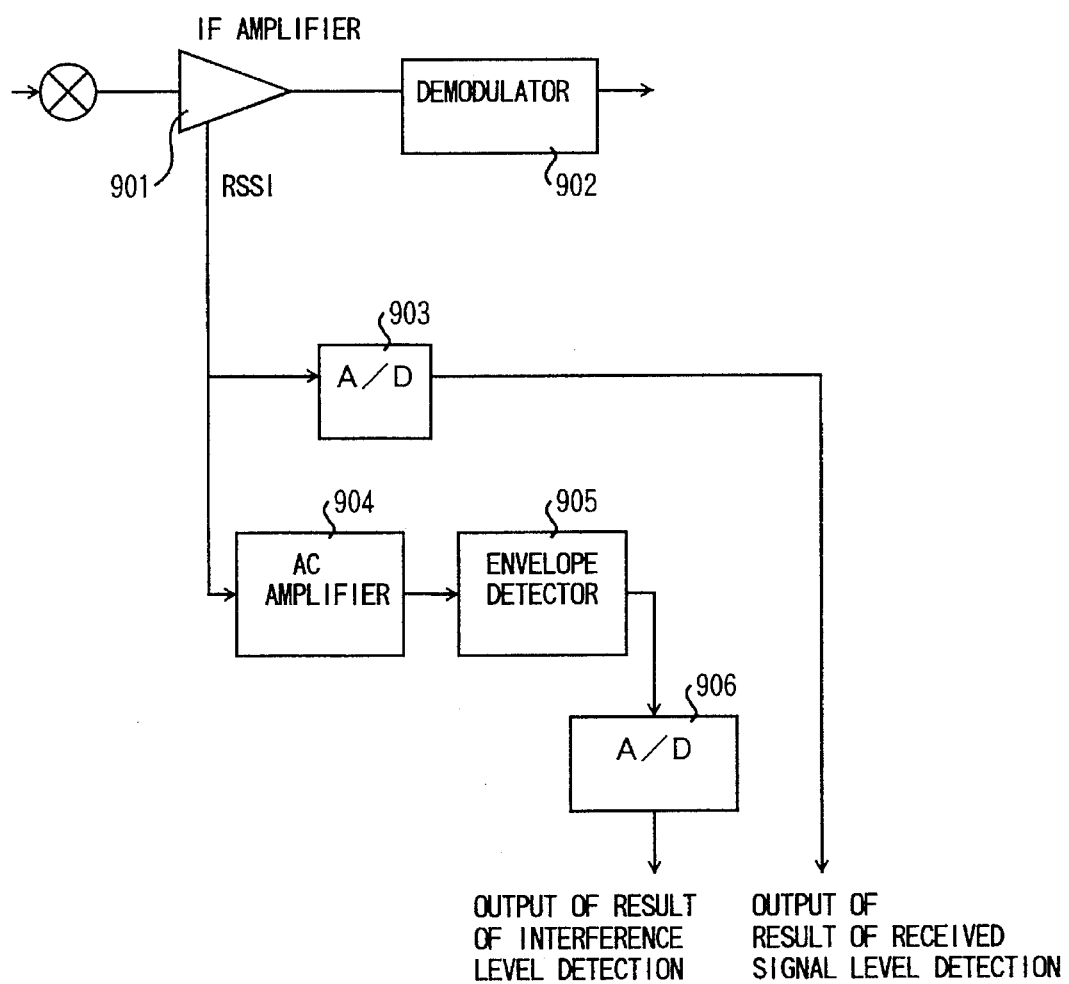
FIG. 10 is an explanatory view for illustrating configuration of a detecting means for detecting a level of a received signal as well as for detecting a level of an interference wave.
Figure 11:
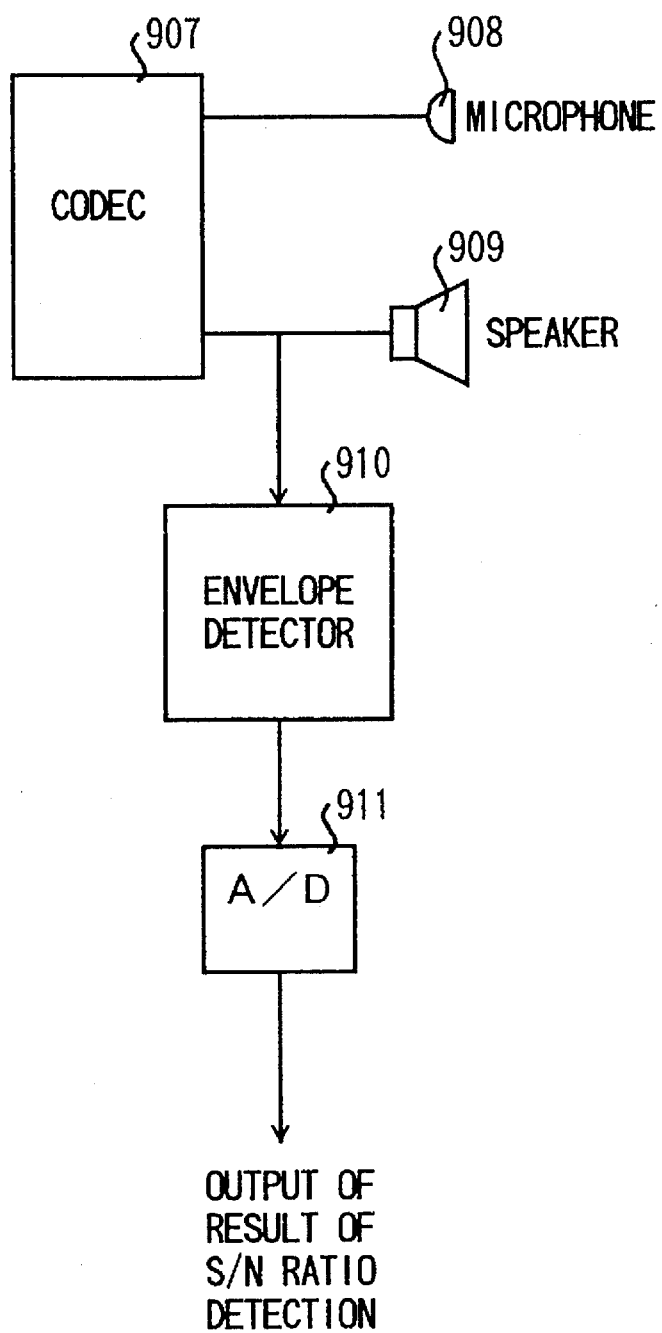
FIG. 11 is an explanatory view for illustrating configuration of a detecting means for detecting a signal vs noise ratio.

Next description is made for a method of detecting a level of a received signal, detecting a level of an interference wave, and detecting a signal vs noise ratio with reference to FIG. 10 and FIG. 11. FIG. 10 shows a means for detecting a level of a received signal as well as for detecting a level of an interference wave, and in this figure, designated at the reference numeral 901 is an IF amplifier, at 902 a demodulator, at 903 an A/D convertor, at 904 an AC amplifier, at 905 an envelope detector, and at 906 an A/D convertor. FIG. 11 shows a means for detecting a signal vs noise ratio, and in this figure, designated at the reference numeral 908 is a microphone, at 909 a speaker, at 910 an envelope detector, and at 911 an A/D convertor.

Next description is made for operations. In FIG. 10 output of a result of RSSI detection is always issued from the IF amplifier 901 in the receiver. This is a DC output obtained by logarithmically amplifying a level of envelope of a received electric wave. Output of a result of received signal level detection is obtained by converting this RSSI output to a digital signal with the A/D convertor 903, and the output is sent to the control circuit.

If there is an interference signal, a constant amplitude modulation signal such as FM modulation generates beat due to the interference wave, and a level of the received signal fluctuates. Output of a result of interference level detection is obtained by amplifying a fluctuating component of the RSSI signal. Namely, an AD component thereof with the AD amplifier 904, detecting the envelope with the envelope detector 905, and converting the result of detection to a digital signal with the A/D convertor, and the output is sent to the control circuit.

Also in FIG. 11, an envelope of a signal outputted via a CODEC 907 from a speaker 909 as an analog signal is a level of the analog modulation signal, and a ratio of a case where there is the modulation signal vs a case where there is not the modulation signal is the S/N ratio. In practice this S/N signal is obtained by adding a modulation signal corresponding to the level as well as the frequency, so that the noise level in a case where there is not a modulation signal is used as an indicator for the S/N ratio. So by detecting a noise level is a state where there is not a modulation signal with the envelope detector 910 and converting the result of detection to a digital signal with the A/D convertor 911, output of detection of the signal vs noise ratio is obtained, and the output is sent to the control circuit.

Although the above embodiment was described by taking up a cordless telephone system as an example, application of the present invention is not limited to a cordless telephone system, and the present system can also be applied to, for instance, a cellular mobile phone on the condition that the equipment is based on a mobile radio communication system.

As described above, in the channel switching control method according to the present invention and a cordless telephone system using it, a correlation value between a received signal and a reference spreading code series is detected, the detected correlation value is compared to a prespecified reference value, and a radio channel is switched according to the result of comparison, so that, even if there occurs strong interference, it is possible to execute channel switching accurately and also to continue communication without giving any trouble to call.

Also in the channel switching control method according to the present invention and a cordless telephone system using it, a correlation value between a received signal and a reference spreading code series is detected, and a radio channel is switched according to a combination of the detected correlation value with at least one of the detected interference wave level, received signal level, and signal vs noise ratio, so that channel switching can be executed more accurately even if there occurs disturbance due to strong interference and furthermore communication can be continued without giving any trouble to call.

Also in the channel switching control method according to the present invention and a cordless telephone system using it, a correlation value between a received signal and a reference spreading code series is detected, the detected correlation value is compared to a prespecified reference value, output of the result of comparison is sampled at a constant time interval, sample values during a cycle which is an integral number times of said time interval for sampling, and if the count becomes lower than a certain value, a radio channel is switched to continue communication, so that it is possible to switch a channel more easily.

Also in the channel switching control method according to the present invention and a cordless telephone system using it, a master phone and a slave phone execute communication by means of time division, and if is determined that synchronism of a burst frame can not be maintained for a certain period of time, the radio channel is switched to continue communication, and also when switching a radio channel, either one of the master phone or the slave phone receives a call by switching a plurality of radio channels, and sends a burst signal for synchronization using an empty channel of the radio channels which received the signal, and on the other hand the other one (master phone or slave phone) receives a burst signal by switching a plurality of radio channels and restarts communication with a radio channel in which the burst signal has been detected, so that channel switching between a master phone and a slave phone can be executed more accurately, and furthermore communication can be continued without causing any trouble in service.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A channel switching control method between a master phone connected to a telephone line and a slave phone providing spread spectrum communication with said master phone via one of a plurality of radio channels each switchable to said master phone comprising steps of:

detecting a correlation value between a received signal and a reference spreading code series;

comparing the detected correlation value to a prespecified reference value; and switching said one of the radio channels when it is determined from the result of comparison that said correlation value is lower than said reference value.

2. A channel switching control method between a master phone connected to a telephone line and a slave phone providing spread spectrum communication with said master phone via one of a plurality of radio channels each switchable to said master phone comprising steps of:

detecting a correlation value between a received signal and a reference code spreading series;

detecting an interference wave level, a level of the received signal and a signal vs noise ratio;

switching said one of the radio channels according to a combination of said detected correlation value with at least one of said detected interference wave level, received signal level and signal vs noise ratio.

3. A cordless telephone system comprising:

a master phone connected to a telephone line;

a slave phone providing spread spectrum communication with said master phone via one of a plurality of radio channels each switchable to said master phone;

a correlation value detector for detecting a correlation value between a received signal and a reference spreading code series, a comparator for comparing the detected correlation value detected by said correlation value detector to a prespecified reference value, and a controller for continuing communications by switching said one of the radio channels when it is determined from the result of comparison with said comparator that said correlation value is lower than said reference value.

4. A cordless telephone system according to claim 3, wherein said controller has a sampling device for sampling an output from said comparator at a constant time interval and a counter for counting sample values during a cycle which is an integral number times of the time interval for sampling described above, and communication is continued by switching said radio channel when the count value provided by said counter goes below a specified value.

5. A cordless telephone system according to claim 3, wherein said controller continues communication by switching said radio channel when it is determined that synchronism of a burst frame can not be achieved for a certain period of time, after time-division communication between said master phone and said slave phone.

6. A cordless telephone system according to claim 5, wherein, when switching said radio channel, either of said master phone or slave phone receives a call by switching a plurality of radio channel and sends a burst signal for synchronization using an empty channel of the radio channels receiving the call, while the other one receives said burst signal by switching a plurality of radio channels and restarts communication through a radio channel in which said burst signal has been detected.

7. A cordless telephone system comprising:

a master phone connected to a telephone line;

a slave phone providing spread spectrum communication with said master phone via one of a plurality of radio channels each switchable to said master phone;

a correlation value detector for detecting a correlation value between a received signal and a reference spreading code series;

a signal level detector for detecting a signal level of said received signal;

a comparator for comparing the correlation value detected by said correlation value detector to a prespecified reference value; and a controller for continuing communication by switching said one of the radio channels according to the result of comparisons by said comparator as well as to the signal level detected by said signal level detector.

8. A cordless telephone system according to claim 7, wherein said controller has a sampling device for sampling an output from said comparator at a constant time interval and a counter for counting sample values during a cycle which is an integral number times of the time interval for sampling described above, and communication is continued by switching said radio channel when the count value provided by said counter goes below a specified value.

9. A cordless telephone system according to claim 7, wherein said controller continues communication by switching said radio channel when it is determined that synchronism of a burst frame can not be achieved for a certain period of time, after time-division communication between said master phone and said slave phone.

10. A cordless telephone system according to claim 9, wherein, when switching said radio channel, either of said master phone or slave phone receives a call by switching a plurality of radio channel and sends a burst signal for synchronization using an empty channel of the radio channels receiving the call, while the other one receives said burst signal by switching a plurality of radio channels and restarts communication through a radio channel in which said burst signal has been detected.

11. A cordless telephone system comprising:

a master phone connected to a telephone line;

a slave phone providing spread spectrum communication with said master phone via one of a plurality of radio channels each switchable to said master phone;

a correlation value detector for detecting a correlation value between a received signal and a reference spreading code series;

an interference wave level detector for detecting a level of interference wave;

a comparator for comparing the correlation value detected by said correlation value detector to a prespecified reference value; and a controller for continuing communication by switching said one of the radio channels according to the result of comparison by said comparator as well as to the detected interference wave level detected by said interference level detector.

12. A cordless telephone system according to claim 11, wherein said controller has a sampling device for sampling an output from said comparator at a constant time interval and a counter for counting sample values during a cycle which is an integral number times of the time interval for sampling described above, and communication is continued by switching said radio channel when the count value provided by said counter goes below a specified value.

13. A cordless telephone system according to claim 11, wherein said controller continues communication by switching said radio channel when it is determined that synchronism of a burst frame can not be achieved for a certain period of time, after time-division communication between said master phone and said slave phone.

14. A cordless telephone system according to claim 13, wherein, when switching said radio channel, either of said master phone or slave phone receives a call by switching a plurality of radio channel and sends a burst signal for synchronization using an empty channel of the radio channels receiving the call, while the other one receives said burst signal by switching a plurality of radio channels and restarts communication through a radio channel in which said burst signal has been detected.

15. A cordless telephone system comprising:

a master phone connected to a telephone line;

a slave phone providing spread spectrum communication with said master phone via one of a plurality of radio channels each switchable to said master phone;

a correlation value detector for detecting a correlation value between a received signal and a reference spreading code series;

a signal vs noise ratio detector for detecting a signal vs noise ratio;

a comparator for comparing the correlation value detected by said correlation value detector to a prespecified reference value; and a controller for continuing communication by switching said one of the radio channels according to the result of comparison by said comparator as well as to the signal vs noise ratio detected by said signal vs noise ratio detector.

16. A cordless telephone system according to claim 15, wherein said controller has a sampling device for sampling an output from said comparator at a constant time interval and a counter for counting sample values during a cycle which is an integral number times of the time interval for sampling described above, and communication is continued by switching said radio channel when the count value provided by said counter goes below a specified value.

17. A cordless telephone system according to claim 15, wherein said controller continues communication by switching said radio channel when it is determined that synchronism of a burst frame can not be achieved for a certain period of time, after said master phone and said slave phone execute communication by means of time division.

18. A cordless telephone system according to claim 17, wherein, when switching said radio channel, either of said master phone or slave phone receives a call by switching a plurality of radio channel and sends a burst signal for synchronization using an empty channel of the radio channels receiving the call, while the other one receives said burst signal by switching a plurality of radio channels and restarts communication through a radio channel in which said burst signal has been detected.

19. A cordless telephone system comprising:

a master phone connected to a telephone line;

a slave phone providing spread spectrum communication with said master phone via one of a plurality of radio channels each switchable to said master phone;

a correlation value detector for detecting a correlation value between a received signal and a reference code series;

a signal level detector for detecting a signal level of the received signal;

an interference wave level detector for detecting a level of an interference wave;

a signal vs noise ratio detector for detecting a signal vs noise ratio;

a comparator for comparing the correlation value detected by said correlation value detector to a prespecified reference value; and a controller for continuing communication by switching said one of the radio channels according to a combination of the result of comparison by said comparator with at least one of the detected interference wave level detected by said interference wave level detector, the received signal level detected by said signal level detector, and the signal vs noise ratio detected by said signal vs noise ratio detector.

20. A cordless telephone system according to claim 19, wherein said controller has a sampling device for sampling an output from said comparator at a constant time interval and a counter for counting sample values during a cycle which is an integral number times of the time interval for sampling described above, and communication is continued by switching said radio channel when the count value provide by said counter goes below a specified value.

21. A cordless telephone system according to claim 19, wherein said controller continues communication by switching said radio channel when it is determined that synchronism of a burst frame can not be achieved for a certain period of time, after time-division communication between said master phone and said slave phone.

22. A cordless telephone system according to claim 21, wherein, when switching said radio channel, either of said master phone or slave phone receives a call by switching a plurality of radio channel and sends a burst signal for synchronization using an empty channel of the radio channels receiving the call, while the other one receives said burst signal by switching a plurality of radio channels and restarts communication through a radio channel in which said burst signal has been detected.

* * * * *